United States Patent [19]
Hedlund

[11] Patent Number: 4,760,316
[45] Date of Patent: Jul. 26, 1988

[54] METHOD FOR CONTROLLING BRUSHLESS D.C. MOTORS AND APPARATUS FOR CARRYING OUT THE METHOD

[75] Inventor: Gunnar Hedlund, Stockholm, Sweden

[73] Assignee: EMS Electronic Motor Systems AB, Stockholm, Sweden

[21] Appl. No.: 60,014

[22] Filed: Jun. 9, 1987

[30] Foreign Application Priority Data

Jun. 17, 1986 [SE] Sweden .............................. 8602693

[51] Int. Cl.$^4$ .......................... H02P 6/02; H02P 5/17
[52] U.S. Cl. .................................. 318/254; 318/434; 318/599
[58] Field of Search ............... 318/138, 254, 432, 433, 318/434, 439, 599

[56] References Cited

U.S. PATENT DOCUMENTS

| | | | |
|---|---|---|---|
| 4,527,102 | 7/1985 | Gotou | 318/254 |
| 4,631,458 | 12/1986 | Furuichi | 318/254 |
| 4,692,674 | 9/1987 | Packard et al. | 318/254 |

FOREIGN PATENT DOCUMENTS

| | | |
|---|---|---|
| 0166501 | 1/1986 | European Pat. Off. . |
| 2126026 | 3/1984 | United Kingdom . |

OTHER PUBLICATIONS

"Inverter Device for Switched Reluctance Motor: Circuits and Component Ratings", *IEE Proc.*, vol. 128, Pt. B., No. 2, By R. M. Davis et al., Mar. 1981, pp. 126–136.
"Linear Integrated Circuits", *Unitrode*, UC3620 Series.

*Primary Examiner*—Bentsu Ro
*Attorney, Agent, or Firm*—Young & Thompson

[57] ABSTRACT

The invention relates to a method for controlling brushless d.c. motors and to a system for controlling such motors, by varying the effective value of current pulses to the phase windings. According to the invention, upon detection of a maximum current state, the effective value of the pulses is decreased by shortening pulses from a given time point within the normally remaining part of the pulses, irrespective of whether the maximum current state ceases during the time that this part of the pulses should have occurred or not. This time point may coincide substantially with the time point at which the state of maximum current was detected or may coincide substantially with the later time point at which the duration of respective pulses exceeds a predetermined minimum value. The next pulse is introduced at the same time point at which it should normally have been introduced.

11 Claims, 7 Drawing Sheets

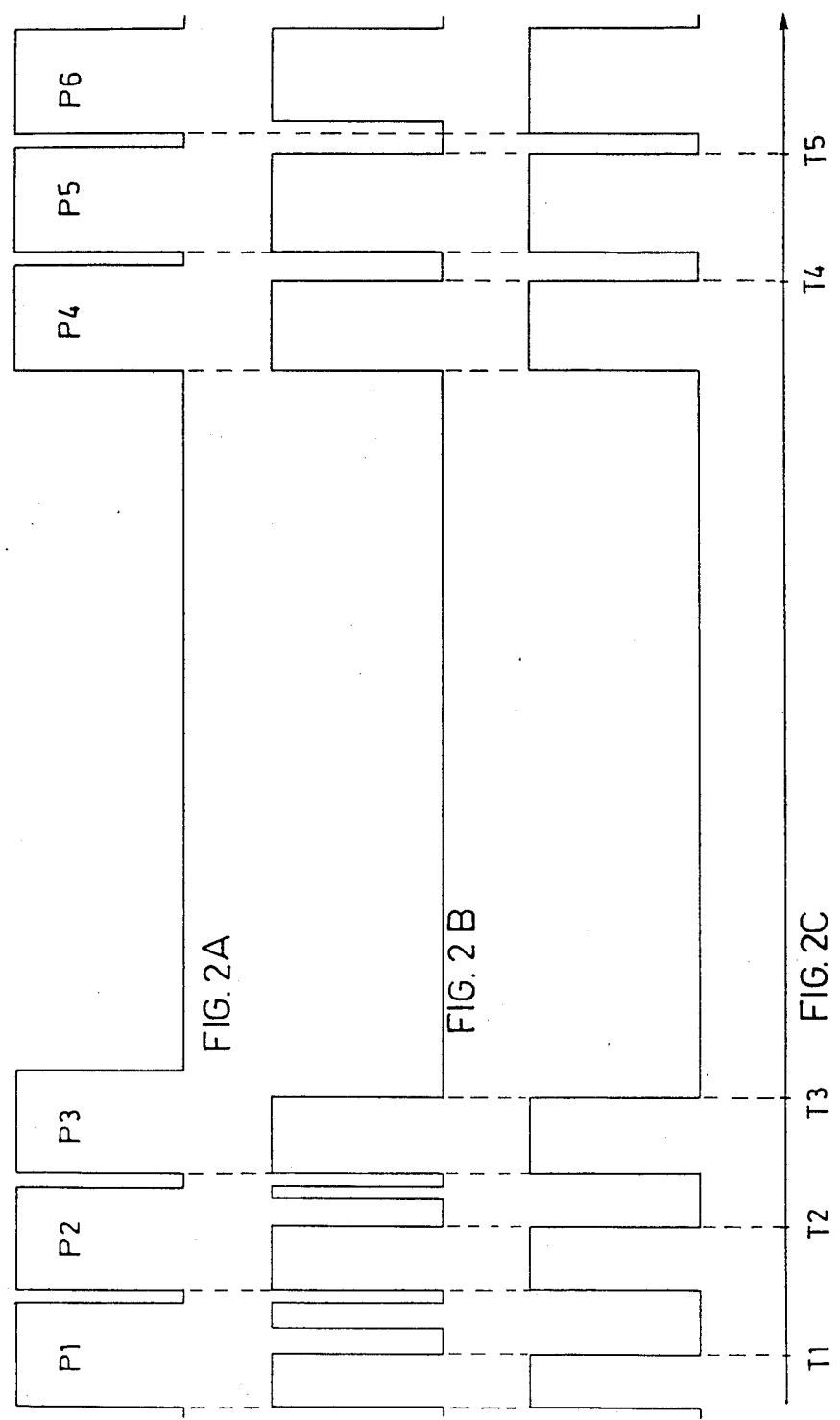

METHOD FOR CONTROLLING BRUSHLESS D.C. MOTORS AND APPARATUS FOR CARRYING OUT THE METHOD

The present invention relates to a method for controlling variable reluctance-type brushless d.c. motors and apparatus for carrying out the method. More particularly, the invention pertains to the current limitation normally applied in methods and apparatus intended for the operation and control of brushless d.c. motors.

A brushless d.c. motor having at least two phase windings is operated by driving current pulses through the phase windings over a time interval which is contingent on rotation of the rotor. The motor can be controlled through variation of the effective value of the current pulses. Normally, in order to achieve optimal construction and operation of such d.c. motors, it is necessary to sense the motor current and to effect control in a manner such as to ensure that the current does not become excessively high. Examples of known methods and arrangements for controlling brushless d.c. motors that have at least two phases are documented in GB Pat. No. 2,126,025, IEE PROC, Vol. 128, Pt. B. No. 2, March 1981, pages 126–136, and technical information concerning drive systems from UNITRODE, entitled "Linear Integrated Circuits", and the designation UC 3620 series.

In the operation of brushless d.c. motors it is usual to steer the frequency and duration of the current pulses with the aid of driving pulses which are synchronized with the rotational angle of the rotor, and the frequency of which is contingent on the speed rotation of the motor, each of the driving pulses normally comprising two or more regularly occurring pulse-width-modulated chopped pulses. The pulse frequency of the chopped pulses is often fixed, i.e. independent of motor speed. When a state of maximum current occurs, i.e. the sensed motor current reaches a highest permitted value, it is normal practice to decrease the effective value of the driving pulses, at least temporarily, in order to abolish the maximum current state. This is normally effected by inhibiting the chopped pulses during the space of time over which a maximum current state is detected or sensed.

According to one known method, no chopped pulse is delivered to the power unit until a predetermined time period has lapsed from the time of detecting the occurrence of a maximum current state. According to another known method, upon detecting the occurrence of a maximum current state no chopped pulse is delivered to the power unit until the motor current has fallen to an established level lower than the level at which the maximum current state was detected. The difference between the levels and the predetermined time, respectively, is then generally determined on the basis of the highest frequency at which certain semiconductor components in the power unit can operate. Other current limiting methods are known to the art, inter alia where actual pulse width-modulation of chopped pulses in the driving pulses is not included.

In known methods for limiting current in conjunction with the operation of a motor, in the context meant here, there is a risk that the motor torque will decrease when a maximum current state is detected. There is also the risk that maximum motor torque will not be obtained with full pulse width modulation, where the highest degree of modulation does not cause detection of a maximum current state. This means that the motor and power stages can only be utilized to a maximum with difficulty, and that it is also difficult to control the motor at high motor-loads.

SUMMARY OF THE INVENTION

Consequently, one object of the present invention is to provide a method and an arrangement with which these drawbacks are not encountered. Another object of this invention is to provide a method and arrangement with which brushless motors of the kind in question can be controlled in a flexible, simple and inexpensive manner. These and other objects are achieved in accordance with the invention, with a method and apparatus as described hereinafter.

The advantages afforded by the inventive method and the inventive apparatus reside in the possibility of obtaining higher torque from a given motor/power-stage combination, and of increasing motor torque monotonously with increased modulation, while obtaining maximum torque at all motor speeds at maximum modulation. This is highly beneficial in systems that incorporate feedback speed control. Another advantage obtained with the invention is that the motor generates less noise, since the control pulses are fewer in number than in conventional motor controls.

BRIEF DESCRIPTION OF THE DRAWINGS

The invention will now be described in more detail with reference to an exemplifying embodiment thereof illustrated in the accompanying drawings, in which

FIGS. 2A–2C illustrate how the driving pulses delivered to a power unit are influenced by a detected state of maximum current;

DETAILED DESCRIPTION OF THE INVENTION

Figure 1:
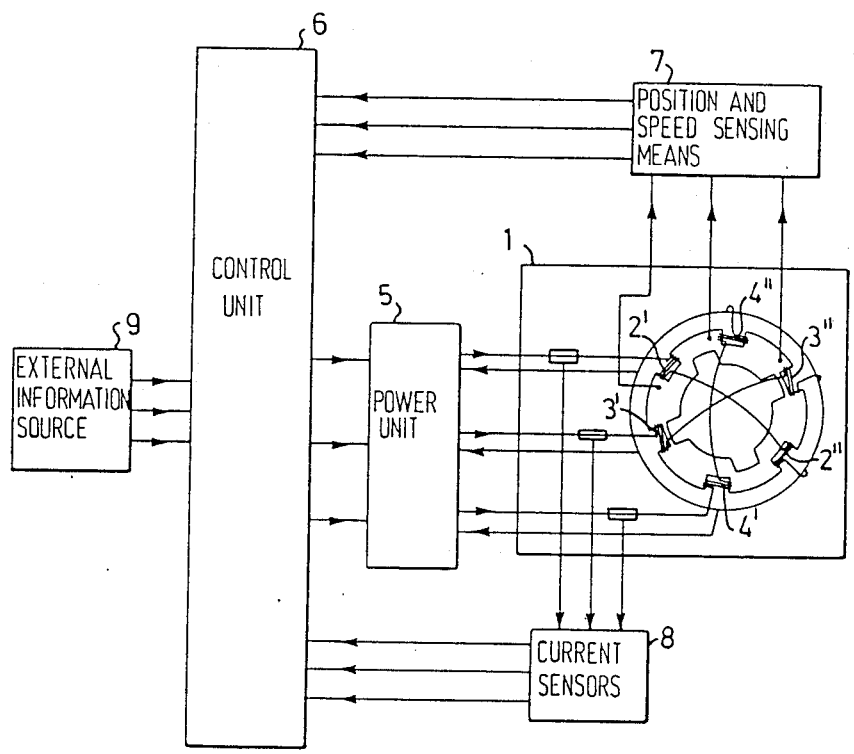
FIG. 1 is a greatly simplified block schematic of a motor control arrangement.

FIG. 1 is a greatly simplified block schematic of a motor control system according to the invention. The purpose of FIG. 1 is not to illustrate in detail the total construction of a complete motor-control system, but rather to illustrate roughly how particularly essential components of such a system co-act with one another. Consequently, the main purpose of the arrows drawn between the various blocks of the block schematic is to illustrate the flow of information and pulses between these components, rather than to denote the number of electric conductors used to interconnect the components in practice. Since the block schematic relates to a three-phase variable reluctance motor, three parallel arrows, conductors or lines have been used in the majority of cases, in order to obtain a lucid and clear block schematic. It will be understood that the number of conductors between the conductors may, in reality, be greater or smaller than that illustrated.

The brushless d.c. motor 1, which in the block schematic has the form of a variable reluctance motor, has three phase windings 2', 2''; 3', 3'' and 4', 4''. The motor is driven from a power unit 5, which sends current pulses to the phase windings. The power unit may, for instance, have double power stages, in a known manner, with transistors (not shown) for each phase. The power source incorporates an energy source, such as an accumulator or battery for example.

The frequency and duration of the current pulses delivered to the phase windings from the power unit are controlled with driving pulses delivered to the power unit from a control unit 6. The control unit receives from sensors 7 information concerning the rotational angle of the rotor and the speed of the motor. For example, three sensors of a known kind may be arranged in connection with respective phases in a manner known per se. As an alternative it is also possible to have a rotational sensing means 7 which derives the rotor speed by monitoring motor signals in a way known in the art and not further described because it is not a part of the actual invention. The control unit also receives information relating to motor current, i.e. the currents i supplied to the phase windings of the motor, with the aid of sensors 8. The sensors 8 may also comprise three known sensors, and are arranged in connection with the power stage of the control unit or the lines to the phase windings, in a manner known per se. Finally, the control unit also receives control information from an external information source 9. The external information soure may, for instance, be constructed to deliver information concerning a set point value relating to motor speed.

The control unit 6 is constructed to vary the driving pulse parameters in response to information received from the sensors and from the external information source, for example to vary the frequency, effective value and phase position of the driving pulses in relation to the angular position of rotor rotation, in order to achieve a desired motor speed at different operating conditions. Certain limitations are found in this regard. One normal and important limitation is that the momentary current in the power stages must be limited, which means that the motor current must not be too high. The invention is primarily directed towards the manner in which the driving pulses are influenced when a maximum current state is sensed in respect of the motor current, i.e. at least one current i supplied to a phase winding or to a power stage has reached its maximum permitted value, at least temporarily, it being assumed here that each driving pulse normally comprises at least two regularly occurring pulse-width modulated chopped pulses.

In FIGS. 2A-2C, the uppermost diagram 2A illustrates two successive driving pulses delivered to the same phase, each of which driving pulses comprises a multiple of regularly occurring chopped pulses P1, P2, P3 in the case of the first driving pulse, and P4, P5, P6 in the case of the other. In one given imagined operating state, it is possible that if a maximum current state is not detected, the control unit will supply the phase-winding power stages in the power unit with driving pulses which, in principle, are similar to those aforementioned but which are displaced in time in relation to one another (60° for a three-phase motor). If it is assumed for the sake of simplicity that the power stage of each phase winding receives its driving pulses via a respective separate line and that the arrows between the blocks 5 and 6 symbolize these lines, it is possible for the chopped pulses shown in FIGS. 2A-2C to appear on one of these lines.

Thus, the upper pulse diagram of FIG. 2A illustrates the configuration of a pulse sequence in the absence of sensing a maximum current state. The intermediate pulse diagram of FIG. 2B illustrates how a detected maximum current state, detected at time points T1-T5 marked on the time axis, influences the pulses sent to the power unit from the control unit when practising a known technique. The lowermost pulse diagram of FIG. 2C illustrates how the detected maximum current states in the system according to the invention influence the pulses sent to the power unit 5 from the control unit 6.

In order to illustrate the difference between the present invention and the known technique in the clearest possible manner, it has been assumed in respect of FIGS. 2B and 2C that a maximum current state is detected during each chopped pulse P1-P6 in FIG. 2A, with the exception of that furthest to the right. It has also been assumed that the occurrence of a maximum current state is detected at time points within respective chopped pulses occurring when progressively less of the respective chopped pulses remain. Furthermore, the wave-form of the chopped pulses, their mutual distance apart and the number in which they appear have been chosen to illustrate, within a restricted space, the difference between the invention and the known technique. This means, however, that the chopped pulses shown in FIGS. 2B and 2C are not illustrative of an operating condition which would normally occur in practice and with which the advantages afforded by the invention would be of clear benefit. It will be seen from FIGS. 2A-2C, among other things, that the maximum current state T1 is sensed approximately at the midway point of the pulse P1, but that the maximum current state T5 is sensed at the very end of the pulse P5.

The first driving pulse in the uppermost diagram 2A of FIG. 2 consists of three chopped pulses P1, P2 and P3, whereas the second driving pulse consists of three chopped pulses P4, P5 and P6. The chopped pulses all have the same width and successive chopped pulses of a driving pulse and are spaced at equal distances apart.

Modulation is maximum or almost maximum, i.e. the space between successive chopped pulses is smaller in comparison with the width of each chopped pulse. The motor also runs at a relatively high speed, which is made evident by the fact that the number of chopped pulses with each driving pulse is low. As illustrated in the pulse diagram of FIG. 2B, when practising the known technique the generation of chopped pulses is interrupted, or the supply of chopped pulses is blocked, for a pre-determined length of time, from that moment of detecting the occurrence of a maximum current state. For the sake of clarity, this time period should have been made twice as great as the distance between successive chopped pulses in FIG. 2B. This interruption in or blocking of the supply of chopped pulses causes the chopped pulses P1 and P2 to be divided into two pulses, the pulse P3 to be shortened quite considerably, the chopped pulse P4 to be slightly shortened, and the chopped pulse P5 also to be shortened, but only to an insignificant extent. The trailing or rear edge of all chopped pulses P3-P5 is shortened. Because the aforementioned predetermined time period is longer than the distance between two successive chopped pulses, and because the maximum current state T5 is detected at the very end of the pulse P5, the chopped pulse P6 will be shortened at its leading edge, despite the fact that no maximum current state is detected during the duration of chopped pulse P6.

The pulse diagram of FIG. 2C, according to the invention, shows clearly that all chopped pulse P1-P5, from the moment of detecting the occurrence of a maximum current state, are shortened by the whole of their normal residual part, according to the uppermost curve. This shortening of the chopped pulse takes place irrespective of whether the maximum current state is detected at the midway point of a pulse or at the end thereof, and irrespective of whether the maximum current state ceases before respective chopped pulses are due to terminate. Each subsequent chopped pulse after the detection of a maximum current state is permitted to commence at a normal time point, provided that the maximum current state detected during the preceding chopped pulse is not still occurrent at the time when the next chopped pulse is due. In this case, and only in this case, introduction of the next chopped pulses is displaced to the time point at which the maximum current state is no longer detected or sensed. Consequently, providing that the maximum current states are of short duration, even the chopped pulse P6 will be introduced at a normal point in time, in accordance with the pulse diagram of FIG. 2A.

In practice a dynamic relationship prevails between the occurrence of a maximum current state and such operational parameters as motor speed, motor load and the modulation of the pulses. In FIGS. 3A-3C, 4A-4C, 5A-5C, an attempt has been made, with the aid of an idealized pulse diagram, to illustrate a few operational conditions in the case of a variable reluctance motor, namely: (a) a few operational conditions when no maximum current state is detected, FIGS. 3A, 4A, 5A; (b) a few operational conditions relating to known techniques, FIGS. 3B, 4B, 5B; and (c) a few operational conditions where control is effected in accordance with the present invention, FIGS. 3C, 4C, 5C. The pulses shown at the bottom of respective diagrams represent part-pulses during one single operating pulse for one phase. The curve which is predominantly uppermost illustrates the motor current in a time sequence. The motor speed is comparatively low in FIGS. 3A-3C and 4A-4C and comparatively high in FIGS. 5A-5C, and hence the time scale is different between these two groups of Figures.

Figure 3A:
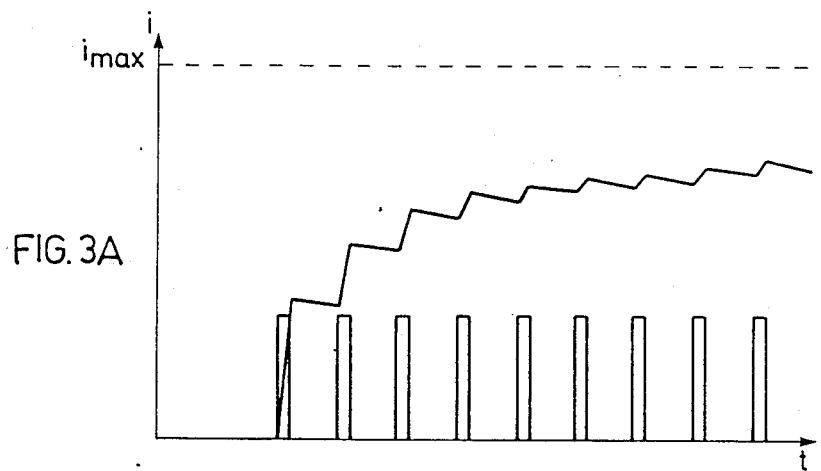
FIGS. 3A–3C, 4A–4C, 5A–5C, 6, and 7 illustrate currents, applied chopped pulses, and maximum current states at different operating conditions of a brushless d.c. motor.
Figure 3B:
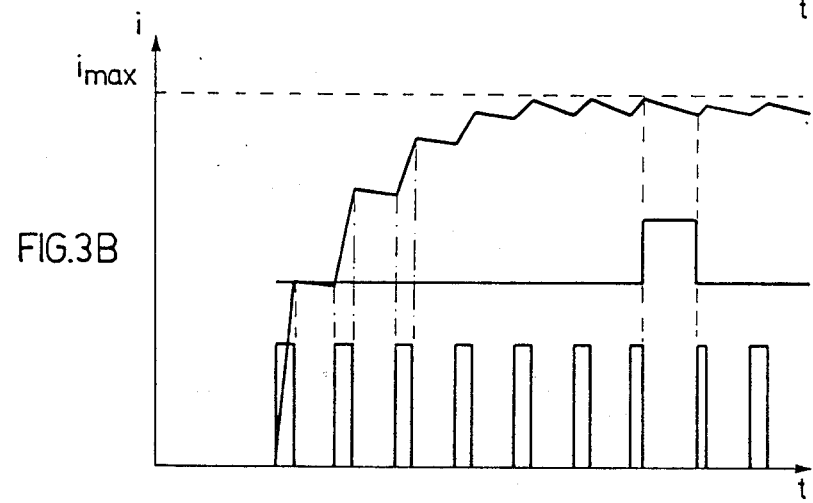
Figure 3C:
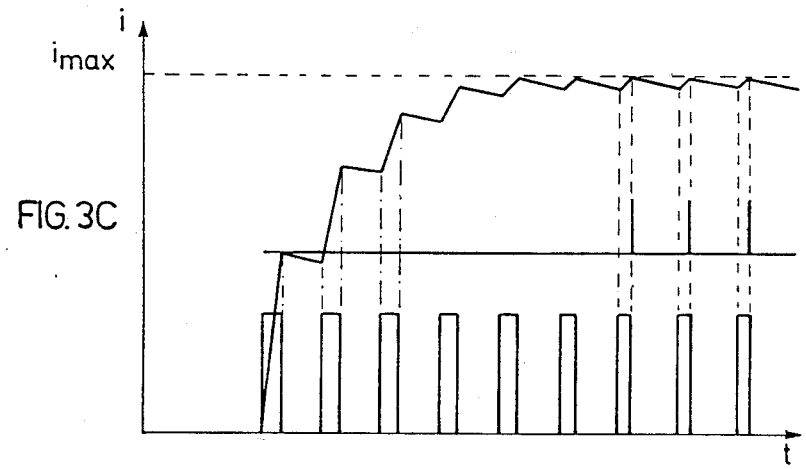
Figure 4A:
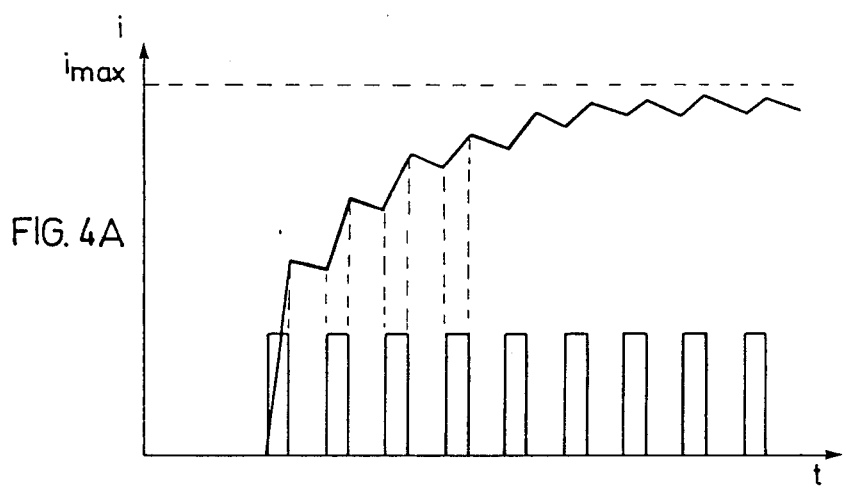
Figure 4B:
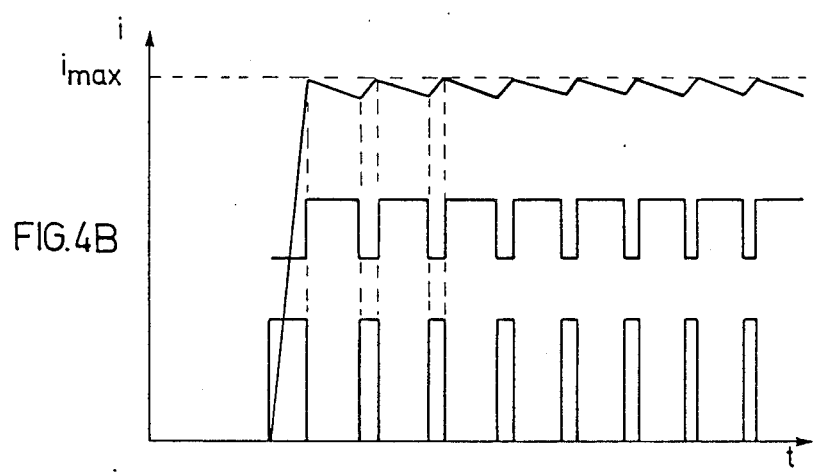
Figure 4C:
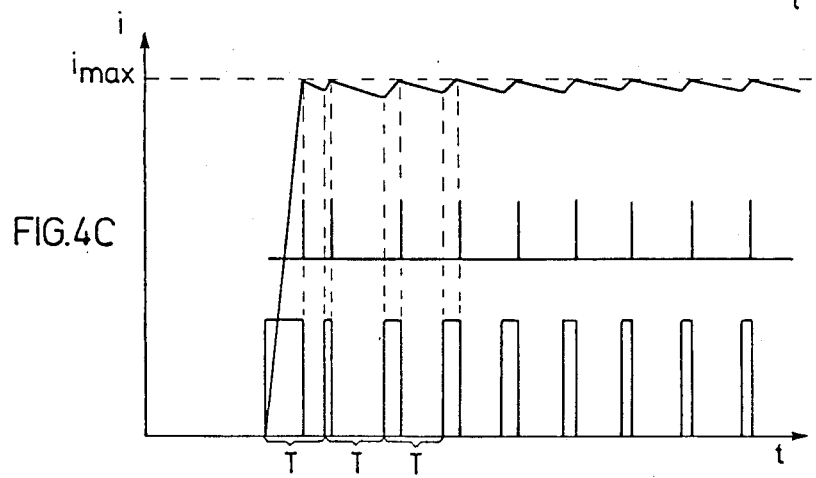
Figure 5A:
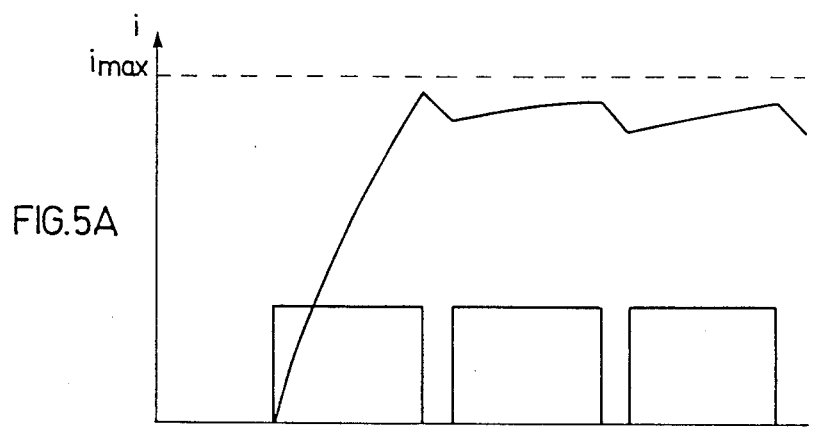
Figure 5B:
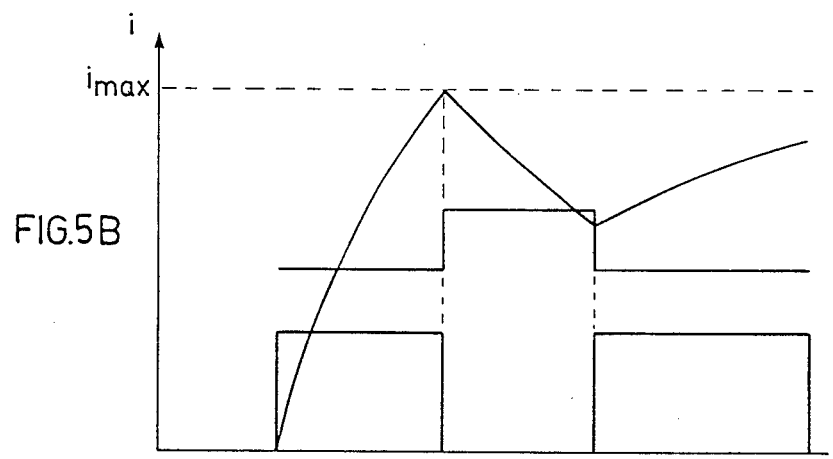
Figure 5C:
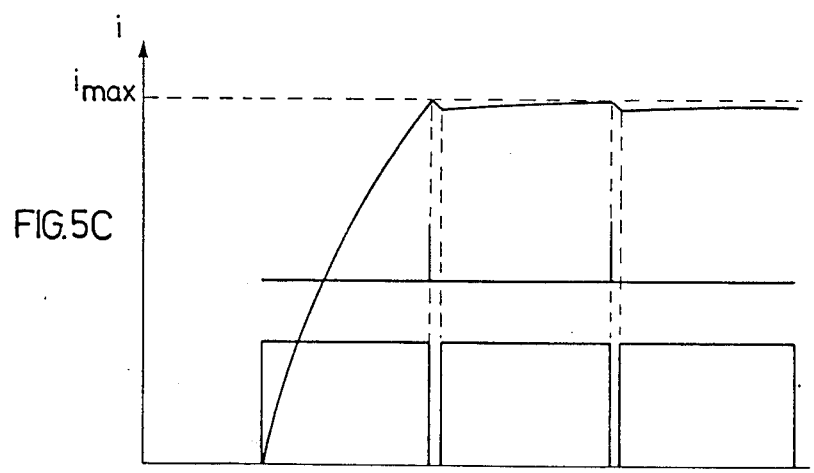
Figure 6:
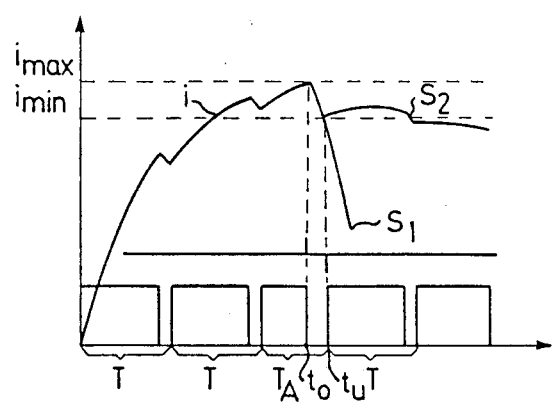
Figure 7:
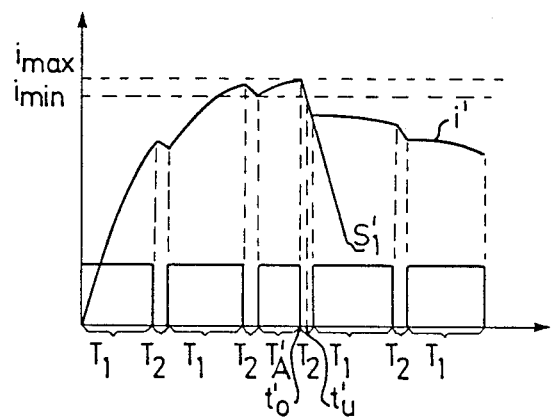

The curve which presents "spiked" narrow pulses between the current curve and the chopped pulses in FIGS. 3C, 4C and 5C illustrates the times at which a maximum current state was sensed or detected. The curve at a corresponding location with solely one wide pulse in FIGS. 3B and 5B and a multiple of wide pulses in FIG. 4B shows the pre-determined times at which chopped pulses are not generated or at which the transfer of chopped pulses is blocked in accordance with known techniques. All FIGS. 3A-3C, 4A-4C, 5A-5C, and also FIGS. 6 and 7 are drawn on the basis of an apparatus having two power stages for each phase and a method in which solely one of the power stages is switched off with the aid of the driving pulses. The voltages across the phase windings are then zero. If, instead of switching off solely one power stage, both power stages are switched off during the interval between the chopped pulses, or if there is used some other switching means in the power unit, the voltage across respective windings can be negative. The motor current will then fall much more rapidly than is indicated by the Figures recited above. A method and system that conform to the principles of the present invention may, of course, also be applied in cases such as these.

With regard to the various operational cases, FIG. 3A illustrates a case when the load is moderate and no maximum current state occurs. This Figure therefore applies both to a system according to the invention and a system according to known techniques. FIG. 3B illustrates the known technique and FIG. 3C illustrates the present invention when the load is high and a maximum current state is detected. In FIG. 3C the last three chopped pulses have been shortened at their trailing edges, whereas in FIG. 3B the pulse that is third from the end is shortened at its trailing edge and the penultimate chopped pulse is shortened at its leading edge. The last chopped pulse in FIG. 3B is not influenced by the maximum current state.

FIG. 4B relates to the known technique and FIG. 4C to the invention when the load is at a maximum and a maximum current state is detected during each chopped pulse. Modulation of the chopped pulses is at maximum during the pulse-width modulation according to FIGS. 4B and 4C, such that the chopped pulses form a continuous driving pulse which is interrupted solely when a maximum current state is detected. The blocking time at maximum current in the case of the system that functions in accordance with the known technique is selected so as not to exceed the working frequency of the power stages. This working frequency also coincides with the frequency of the pulse width modulated chopped pulses. As a result, the frequencies in FIGS. 4B and 4C are roughly the same, i.e. are identical in the known technique and the inventive technique at the low motor speeds to which those Figures relate. By way of comparison, FIG. 4A illustrates a curve form with a control pulse width that coincides approximately with the obtained pulse width in FIGS. 4B and 4C, and where maximum current is not reached. At higher motor speeds, when no maximum current state occurs, the conditions are the same as those experienced with the invention and with known techniques. FIG. 5A illustrates one such case in operation. FIG. 5B illustrates the known technique when the load has increased above the load in the FIG. 5A illustration. Pulse modulation has also been increased, in order to maintain a preselected or set motor speed, and is in this case at a maximum. When a maximum current state is detected, the power stage is switched off and is held switched off for a given length of time, which is of the same duration as in FIGS. 3B and 4B. (The time scales are different in FIGS. 3A-3C and FIGS. 4A-4C and FIGS. 5A-5C.) As a result, the effective current value, and therewith the motor torque, falls and in the operational case illustrated in FIG. 5B is lower than in the operational case illustrated in FIG. 5A, despite higher modulation. Thus, in this case the motor torque is lower than the load and the set/desired speed cannot be maintained.

FIG. 5C illustrates the invention when the load and modulation is maximum and the occurrence of a maximum current state is detected during the first two pulses. The counter-EMF or back-EMF of the motor is sufficient, in this case, to avoid maximum current during the last pulse.

A number of the advantages achieved when effecting control in accordance with the invention will be apparent from the foregoing. For example, it is possible to obtain greater torque from a given motor, to increase the motor torque monotonously with increasing modulation, and to obtain maximum torque at all motor speeds at maximum modulation. This is highly beneficial in systems incorporating feedback speed control.

According to one embodiment of the invention preferred for certain situations and for certain operational cases, when the occurrence of a maximum current state is detected during a chopped pulse, the next following chopped pulse may also be influenced by this maximum current state. The reason for this is that there is a certain delay between the moment at which the power stages are switched off and the moment at which this takes effect, this delay being dictated by reasons of a constructional nature. Consequently, subsequent to switching-off, the current will be slightly higher than the current limit level. At high motor speeds and practically full pulse-width-modulation, or at very low motor speeds and low modulation, this may cause the level of current to remain above the current limit level when the next pulse-width-modulated chopped pulse is due to arrive. A similar situation may also arise as a result of the fact that for commutation reasons, the power stages have an onstate time of minimum duration and hence a switch-off will not always take effect immediately upon detection of all maximum current states. In some cases when a maximum current state is detected, the chopped pulse is inhibited until the current limit no longer indicates a state of maximum current. Thus, in this case the chopped pulse is shortened at its leading edge. In extreme cases it is possible that the whole chopped pulse, or even more than one chopped pulse, will be inhibited at low motor speeds.

The method in which the whole of the residual part of a chopped pulse is shortened in accordance with the invention is extremely effective, provided that the counter-EMF is lower than the operating voltage. As is well known, this is the case provided that the curve i rises.

The above control principles are also effective when the counter-EMF is higher than the operating voltage, i.e. also with curves obtained when plotting the motor current i as a function of time and having curve portions which fall even during driving operation. However, it is possible here to lose the advantages afforded by said control in certain cases. In accordance with a further development of the invention, a limit is placed on the maximum current permitted and the minimum current permitted (maximum and minimum current states), particularly during intervals at which the motor current falls or rises very slightly during driving of the motor. In order for the circuit to react to a minimum current state, it is necessary to fullfil the condition that a maximum current state has been detected during the same chopped pulse period as that in which the minimum current state is detected. In distinction to prior art control systems which employ switch-on when sensing the minimum motor current limit and switch-off when sensing the maximum motor current limit, the further development of the present invention is characterized by an effort to keep to the base frequency of period T (c.f. FIG. 6) to the greatest extent possible. Consequently, in accordance with this further development, the actual period itself is shortened solely in the interval in which a minimum current state is detected, although the system self-adjusts in preparation for the fact that the next period, starting from the leading flank of the next pulse, shall have the period T, i.e. the period of the chopped pulse frequency. The problem of high counter-EMF is particularly manifest at high motor speeds. The speed at which this problem can begin to manifest itself depends on the construction of the motor concerned. This speed normally lies roughly at half the maximum speed, although wide variations are found, both in an upward and in a downward direction. When practicing this further development of the invention, it is not suitable to control the system by sensing both maximum and minimum current states at low motor speeds with many chopped pulses per driving pulse. Neither are the good attributes of the fundamental part of the invention negated by a high counter-EMF at low motor speeds. Consequently, in accordance with this further development of the invention, there is pre-selected a motor speed limit above which the level of minimum current is set. The motor speed limit is preferably incorporated during the manufacturing stage or by the motor supplier, although a facility may be incorporated by means of which the motor speed limit can be varied, for instance with the aid of a manually operated control device.

There are two embodiments by means of which control according to this further development of the invention can be put into effect. Curve forms and methods of operation are illustrated in FIGS. 6 and 7 respectively.

FIG. 6 illustrates chopped pulses and a motor current diagram according to the first embodiment of the further development of the invention. Two levels are drawn in the diagram, namely $i_{max}$ and $i_{min}$. The motor rotates at a high speed. Consequently, there are only a few chopped pulses (five in number) in the illustrated embodiment. Driving of the motor during the duration of the chopped pulses follows the course of a curve whose slope is dependent on time. The curve form is determined by the generally known relationship $$U = L \times di/dt + i \times dL/dt$$

where U is the driving voltage, i is the motor current, L is the winding inductance, and t is the time, $i \times dL/dt$ is the counter-EMF. It will be seen from FIG. 6 that the drive during the first chopped pulse rises steeply, although this rise decreases gradually during the following chopped pulses. The drive during the last chopped pulse has a falling curve form. During the third a maximum current state is indicated at time point $t_o$. The sharply falling curve form would continue right down to $S_1$ during the next pulse pause, if detection of a minimum current state did not take place. The current curve now reaches the level $i_{min}$ at time point $t_u$. The next chopped pulse is commenced immediately upon detection of the minimum current state. The normal chopped pulse period is thus T, although when a minimum current state is detected, the period in the occurrent chopped pulse period is shortened to $T_A$. The period time of subsequent periods is not affected. An important feature of the further development of the invention is illustrated in the fourth chopped pulse period. The falling part of the curve 1 passing through the pulse interspace continues through the $i_{min}$ level without the minimum current state being detected. This is because no maximum current state has been detected within the same chopped pulse period. Consequently, no minimum current state detection takes place.

FIG. 7 illustrates another embodiment of the further development according to the invention. In this embodiment each chopped pulse period T is divided into the pulse interval T1 and the pulse interval T2. According to this embodiment, the duration of each pulse interspaced must at least reach the time T2. This is shown for the third pulse period in FIG. 7, where the maximum current state is detected at time point $t'_o$. At time point $t'_u$, the falling part of the curve $i'$ lies beneath the following pulse pause. The duration of the pulse pause has then been shorter than T2, and hence the pulse pause will continue until it reaches T2. The next chopped pulse period then commences.

If no minimum current state had been detected in accordance with this further development, the falling part of the curve during the third period would have reached $S'_1$ before commencing the next chopped pulse.

Of the two aforedescribed embodiments, the latter is preferred. By incorporating a limit motor speed for initiating the detection of a possible minimum current state, the transition between states with and without this kind of switching is effected more uniformly with the latter embodiment than with the former.

Figure 8:
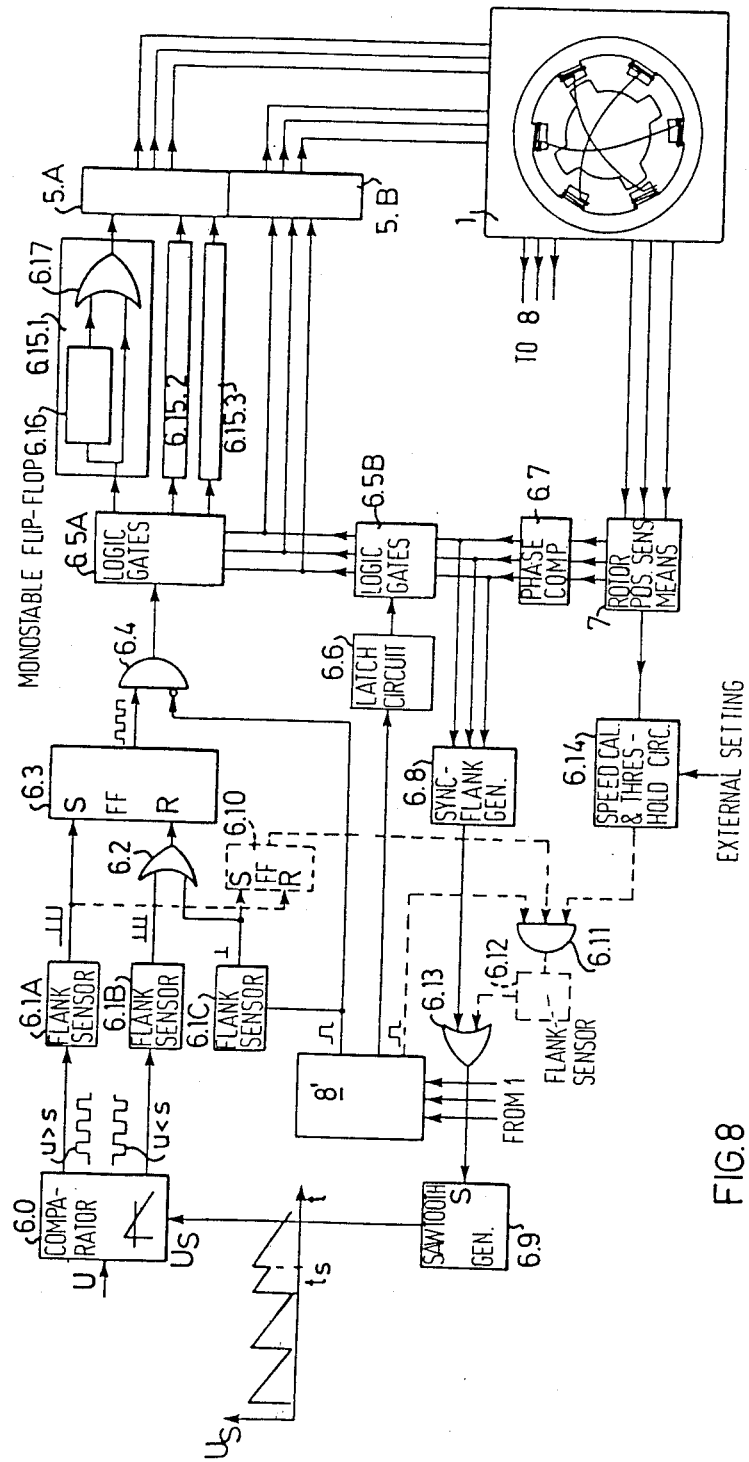
FIG. 8 is a somewhat more detailed block schematic than FIG. 1, of an arrangment according to the invention.

FIG. 8 is a block schematic illustrating a preferred embodiment of a system constructed in accordance with the invention. For the sake of simplicity certain components of minor importance have been omitted from the Figure, for example the external information source for set-point values and the means for making comparisons between set-points and real values. In FIG. 8 the references used to identify the components of the FIG. 1 block schematic have been retained followed by a period, or full stop. The reference following the period or full stop denotes the separate unit or component included in the block. The "external" input signal to the block schematic is therefore a modulating signal U to the comparator 6.0, this modulating signal deriving from the components omitted from the Figure. The comparator is constructed to compare the level of the modulating signal with a ramp or sawtooth signal $U_s$ arriving from the sawtooth generator 6.9. The sawtooth signal has a steeply rising leading flank and a sloping trailing flank, as will be seen from the waveform diagram drawn in the Figure on the line extending between the generator 6.9 and the comparator 6.0. The sawtooth generator is phase-adjusted at appropriate times by pulses arriving on an input s, as described in more detail hereinafter. Such an adjustment has been effected at time point $t_s$.

The comparator 6.0 generates a first train of pulses which have a high or a low level, depending on whether the level of the modulating signal is higher or lower than the level of the ramp or sawtooth signal. The modulating signal U is constant within a driving pulse interval, so that the pulses normally have a constant width within said interval. This first pulse train is applied to a first flank sensor 6.1A which is operative in generating a high level pulse of short duration each time the first pulse train passes from a low level to a high level. The comparator 6.0 also generates a second pulse train, the level of which is complementary to the level of the first pulse train. This second pulse train is applied to a second flank sensor, or flank circuit, 6.1B, which is operative in generating a high level pulse of short duration each time the second pulse train passes from a low level to a high level. An OR-gate 6.2 receives the pulses deriving from the second flank sensor and pulses which derive from a third flank sensor 6.1C.

An SR-type bistable flip-flop 6.3 is arranged to receive on its setting input the pulse arriving from the first flank sensor and to receive on its re-setting input R, via the OR-gate 6.2, the pulses deriving from the second and the third flank sensor 6.1B, 6.1C. The bistable flip-flop 6.3 will therefore generate on its output a third pulse train, the pulse/time ratio of which will coincide with the pulse/time ratio of the first pulse train deriving from the comparator, provided that no pulses are delivered to the OR-gate 6.2 from the third flank sensor 6.1C.

The third flank sensor 6.1C generates a high level pulse of short duration each time the sensing unit 8' begins to generate a signal that indicates the occurrence of a maximum current state. Detection of a miximum current state while the pulse train from the bistable flip-flop has a high level therefore causes the flip-flop 6.3 to be restored, or re-set, and the level becomes low. The pulse train will not then return to a high level until a high level pulse from the first flank sensor appears on the setting input S of the flip-flop 6.3. Consequently, the high level pulses from the bistable flip-flop 6.3 are shortened by the whole of their normally remaining part, irrespective of whether the maximum current state ceases or not during the time that this normally residual part of the pulses should have been present.

The signal from the sensing unit 8' indicating the occurrence of a maximum current state are also applied to an inverting input of an AND-gate 6.4. The other gate-input, which is not inverting, is supplied with the third pulse train from the flip-flop 6.3. The AND-gate 6.4 transfers the pulse train deriving from the flip-flop 6.3 to an input of first logic gates 6.5A, but only in the absence of a signal from the sensing unit 8' indicating that a maximum current state has occurred.

The sensing unit 7 monitoring the rotational position of the rotor transmits rotor position signals to a phase compensator 6.7, which in turn sends phase-compensated rotor position signals to logic gates 6.5B and to a synchronizing flank sensor 6.8. The synchronizing flank sensor 6.8 generates synchronizing signals which are applied to the sawtooth generator 6.9 for intermittent synchronization, once for each driving pulse, of the phase position of the ramp or sawtooth signal from the sawtooth generator 6.9 with the rotational position of the rotor. This results in synchronization of the chopped pulses with the driving pulses. Thus, the purpose of the phase compensator 6.7 in this case is to render the phase position of the driving pulses in relation to the rotor dependent on rotor speed, c.f. GB No. 2 126 026. On the other hand, the frequency of the sawtooth generator 6.9 of the FIG. 8 embodiment, i.e. the duration of the individual ramp or sawtooth signals in time, is not dependent on the speed of the rotor.

When using the inventive control relating to the further development described above with reference to FIG. 6, the circuit illustrated in FIG. 8 is complemented with an SR-type bistable flip-flop 6.10, an AND-gate 6.11, a flank sensor 6.12, and an OR-gate 6.13. The signal deriving from the flank sensor 6.1C is coupled to the setting input of the flip-flop 6.10, and the signal from the flank sensor 6.1A is coupled to the re-setting or restoring input of said flip-flop. The flip-flop 6.10 is, in this way, set each time that a maximum current state is detected and restored at the beginning of each new chopped pulse. In this case the current sensor unit 8 is constructed to apply a pulse on a second input, when the motor current reaches a pre-determined minimum value which the current must not fall below during the same chopped pulse period as that in which a maximum current state has been detected.

The rotor position sensing unit 7 has an output which is connected to a rotation speed counter and threshold value circuit 6.14 which calculates the speed and produces a logic "1"-signal on its output when the rotation speed exceeds a pre-determined value. This value can be set during the manufacturing stage, or provisions can be made which enable the value to be adjusted by the user.

The respective outputs of the flip-flop 6.10, the current sensing unit 8', and the circuit 6.14 are each connected to a respective input of the AND-gate 6.11. The AND-gate will thus produce a pulse if a minimum current state is detected during the same chopped pulse period as that in which a maximum current state has been detected. The output of the AND-gate 6.11 is connected to the flank sensor 6.12. The spiked output signal driving from the flank sensor is fed to the sawtooth generator 6.9, via the OR-gate 6.13. The output of the syncflank sensor 6.8 is connected to the other input of the OR-gate 6.13. (It is connected directly to the generator 6.9 if the further development is not used.) The sawtooth generator 6.9 reacts in the same manner for the signals from the flank sensor 6.8 and 6.12 and immediately commences a new period, as illustrated at time point $t_s$.

In order to avoid damage as a result of certain faults, e.g. in the control unit and/or the sensors in the sensing unit 8', the arrangement illustrated in FIG. 8 is provided with an emergency stop facility which, upon detection of an exceptionally high excess current or current surge, will permanently switch off both power stages to respective phases. To this end the sensing unit 8' is constructed to generate an emergency stop signal on a third output coupled to the input of a latch circuit 6.6, upon detection of a current which is considerably higher than that required to constitute the aforesaid maximum current state. Upon receipt of this signal, the latch circuit 6.6 sends a switch-off signal to the second logic gates 6.5B. The latch circuit is also arranged to continue to send the switch-off signal even if the sensing unit 8' ceases to generate the emergency stop signal.

The second logic gates 6.5B are coupled to the first power stage 5.A of the phases, via the first logic gates 6.5A, and also directly to the second power stage 5.B of said phases. Consequently, when an emergency stop signal is generated, both power stages 5.A and 5.B are permanently switched-off, whereas when a maximum current signal is generated only the first power stage 5.A is switched-off, temporarily. Consequently, in the FIG. 8 embodiment the chopped pulses discussed above with reference to FIGS. 2A to 2C, 3A to 3C, 4A to 4C, are transmitted from the first logic gates 6.5A to the first power stages 5.A. The pulse-width-modulation is effected mainly by the comparator 6.0. Shortening of the chopped pulses is effected by the flip-flop 6.3, and elimination of solitary chopped pulses is effected by the AND gate 6.4.

In the embodiments described hitherto, when maximum current states occur the respective chopped pulses are shortened from the moment of detecting the respective maximum current states. In certain instances, however, it is desirable to ensure that the duration of respective chopped pulses will not fall beneath a given minimum value enforced by the nature of the components used in the system. In cases such as these, the described embodiments can be complemented with embodiments and devices which will ensure that the given time point from which respective chopped pulses are shortened coincides essentially with either the time point at which respective maximum current state are detected, or the later point in time at which the duration of respective chopped pulses exceeds a predetermined minimum value. In this case, the FIG. 8 embodiment may have a pulse extending unit 6.15.1, 6.15.2 or 6.15.3 respectively coupled in each branch connected between the logic gates 6.5A and the one power stage 5.A. This pulse-extending unit may have various different forms. In the block 6.15.1 this unit is shown, by way of example, to include a monostable flip-flop 6.16 which is fed on the input thereof with the signal present on the relevant output of the logic gates 6.5A. The activation time of the monostable flip-flop 6.16 is equal to said minimum value of the duration of the chopped pulses. The output of the flip-flop 6.16 and the relevant output of the logic gates 6.5A are each coupled to a respective input of an OR-gate 6.17. The output of this OR-gate 6.17 is coupled to the first input of the first power stage 5.A.

The control system illustrated in FIG. 8 incorporates conventional circuits. It will be readily understood that modern technology enables the control to be accomplished equally as well with, e.g., the aid of a microprocessor which is programmed to simulate the circuitry of FIG. 8.

The control shown in FIG. 7 has not been illustrated with the aid of coupling circuitry. This is because the control illustrated in this Figure cannot be achieved readily with conventional circuitry techniques, i.e. with the aid of pure hardware. The control can, on the other hand, be readily accomplished with the aid of software, with the use of a microprocessor. The program will then incorporate program loops for producing the times T1 and T2 and T1+T2, and also condition batches for shortening the time T1 upon detection of a maximum current state and to shorten the waiting time T2 before the introduction of the next pulse period.

It will also be understood that many modifications can be made to the described and illustrated embodiments without departing from the concept of the invention.

I claim:
1. A method for controlling a brushless d.c. motor having at least two phase windings, each phase winding supplied with current pulses having a frequency and duration steered by driving pulses synchronized with the rotation of the rotor of said motor, said driving pulses having a frequency related to the motor speed, each driving pulse for each winding including two or more pulse-width-modulated chopped pulses occurring at a given choped pulse frequency wherein each chopped pulse period comprises a chopped pulse followed by a pulse pause, comprising the steps of:
monitoring the motor current to detect occurrence of a predetermined maximum current state during a chopped pulse within which the motor current has reached a highest permitted value;
upon detection of said predetermined maximum current state, increasing the pulse-pause/pulse ratio in those chopped pulse periods within which said maximum current state was detected; and wherein
upon detection of said predetermined maximum current state during said chopped pulse, the chopped pulse concerned is inhibited from a given first time point during the remainder of the chopped pulse period, irrespective of whether the maximum current state ceases during this chopped pulse period or not; if the predetermined maximum current state has ceased at the commencement of the next chopped pulse period in sequence, the introduction of the next chopped pulse takes place at the beginning of this period; and if it is detected that the predetermined maximum current state still prevails at the beginning of the next chopped pulse period, the next chopped pulse is delayed to a point in time at which the predetermined maximum current ceases to exist.

2. A method according to claim 1, wherein a minimum time is set for the duration of each chopped pulse; said given first time point at which the chopped pulse is shortened upon detection of said predetermined maximum current state normally coincides with the time point at which the maximum current state is detected, but coincides with the time point at which the minimum time for the duration of the chopped pulse has expired if the maximum current state is detected prior to this time point.

3. A method according to claim 1, wherein within a chopped pulse interval in which a maximum current state is detected, further includes the step of detecting a predetermined minimum current state in which the motor current has reached an absolute minimum value within that chopped pulse interval; and wherein, upon detection of said minimum current state the occurrent chopped pulse period is shortened and the next chopped pulse period is commenced from a given second time point during the remainder of the first-said chopped pulse period, while retaining the ordinary period length of the next chopped pulse period and the following chopped pulse periods.

4. A method according to claim 3, wherein said given second time point coincides with the time point at which the state of minimum current is detected.

5. A method according to claim 3, wherein the pulse pause is imparted a minimum time duration after a chopped pulse; and when the minimum current state is detected, if the minimum time duration of the pulse pause has expired subsequent to the chopped pulse which has been shortened upon detection of the predetermined maximum current state, the given second time point coincides with the time at which the minimum current state was detected, whereas if the minimum time duration of the pulse pause has not expired, the given second time point coincides with the time point at which the minimum pulse pause terminated.

6. A method according to claim 3, wherein detection of the minimum current state is instigated solely when the motor speed exceeds a given value.

7. In a system for controlling a brushless d.c. motor having at least two phase windings, said system comprising: a power unit for sending to the phase windings current pulses having a frequency and duration steered by driving pulses delivered to the power unit; a control unit for generating said driving pulses that are synchronized with the rotation of the rotor of said motor, said driving pulses having a frequency in relation with the speed of the motor, each of the driving pulses for each phase winding normally comprising two or more regularly occurring pulse-width-modulated chopped pulses followed by pulse pauses; sensing means for monitoring the motor current to detect a predetermined maximum current state in which the motor current has reached a highest value permitted for the prevailing point in time, said control unit having means for increasing the pulse-pause/pulse ratio during those chopped pulse periods within which the maximum current state is detected; the improvement in which said control unit comprises means for, upon detection of the maximum current state during the period of the chopped pulse, shortening the chopped pulse supplied to the power unit from a given first time point during the remainder of the chopped pulse period, irrespective of whether or not the state of maximum current ceases, and means for, subsequent to the detection of the maximum current state, generating a next following chopped pulse at the normal commencement of the next chopped pulse period if the maximum current state has ceased at this point in time, or delaying the generation of said next following chopped pulse to the time point at which the maximum current state ceases if the maximum current state still prevails at the beginning of the next chopped pulse period.

8. A system according to claim 7, wherein the control unit includes means for, if the maximum current state is detected and the duration of the chopped pulse is shorter than a predetermined minimum time, delaying said shortening of the chopped pulse to a time point subsequent to that at which the predetermined minimum time has expired or otherwise permitting said given first time point to coincide with the time at which the maximum current state was detected.

9. A system according to claim 7, wherein the sensing means for monitoring the motor current comprises means for detecting a minimum current state in which, during a chopped pulse period within which the maximum current state has been detected, the value of the motor current lies at an absolute pre-set minimum for the duration of this chopped pulse period; and further comprising means for shortening an occurrent chopped pulse period upon the detection of the minimum current state while retaining an ordinary period length for subsequent chopped pulse periods.

10. A system according to claim 9, further comprising a threshold value device for calculating the speed of the motor on the basis of signals arriving from a rotor position sensing means for the motor, and which produces a signal when the speed exceeds a given level; and wherein said means for shortening an occurrent chopped pulse period is activated solely upon the arrival of a signal from said threshold value device.

11. A system according to claim 9, wherein said means for shortening an occurrent chopped pulse period comprises means for ensuring an absolute minimum pulse-pause time has passed after a preceding chopped pulse before said chopped pulse is shortened, and means for, if the minimum pulse-pause time has expired upon detecting the occurrence of a minimum current state, shortening the occurrent pulse pause immediately upon the detection of said minimum current state; and means for, if the minimum pulse-pause time has not expired when the minimum current state is detected, delaying the shortening of the occurrent pulse-pause until the time at which the minimum pulse-pause time expires.

* * * * *